Sept. 13, 1966 R. A. HAVERL 3,272,004
HORSEPOWER REMAINING COMPUTER
Filed Sept. 3, 1963 3 Sheets-Sheet 1

INVENTOR
RONALD A. HAVERL
BY
ATTORNEY

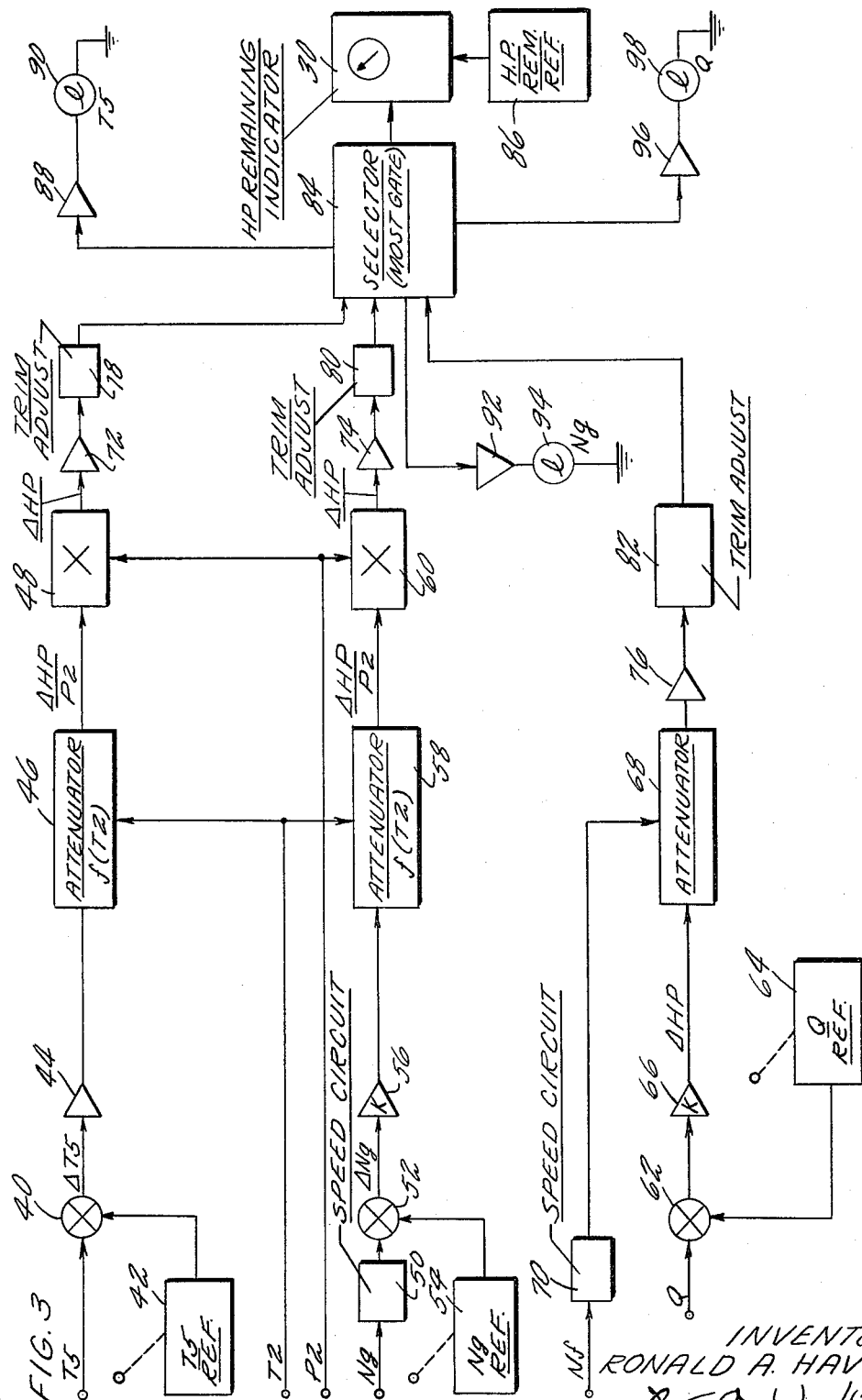

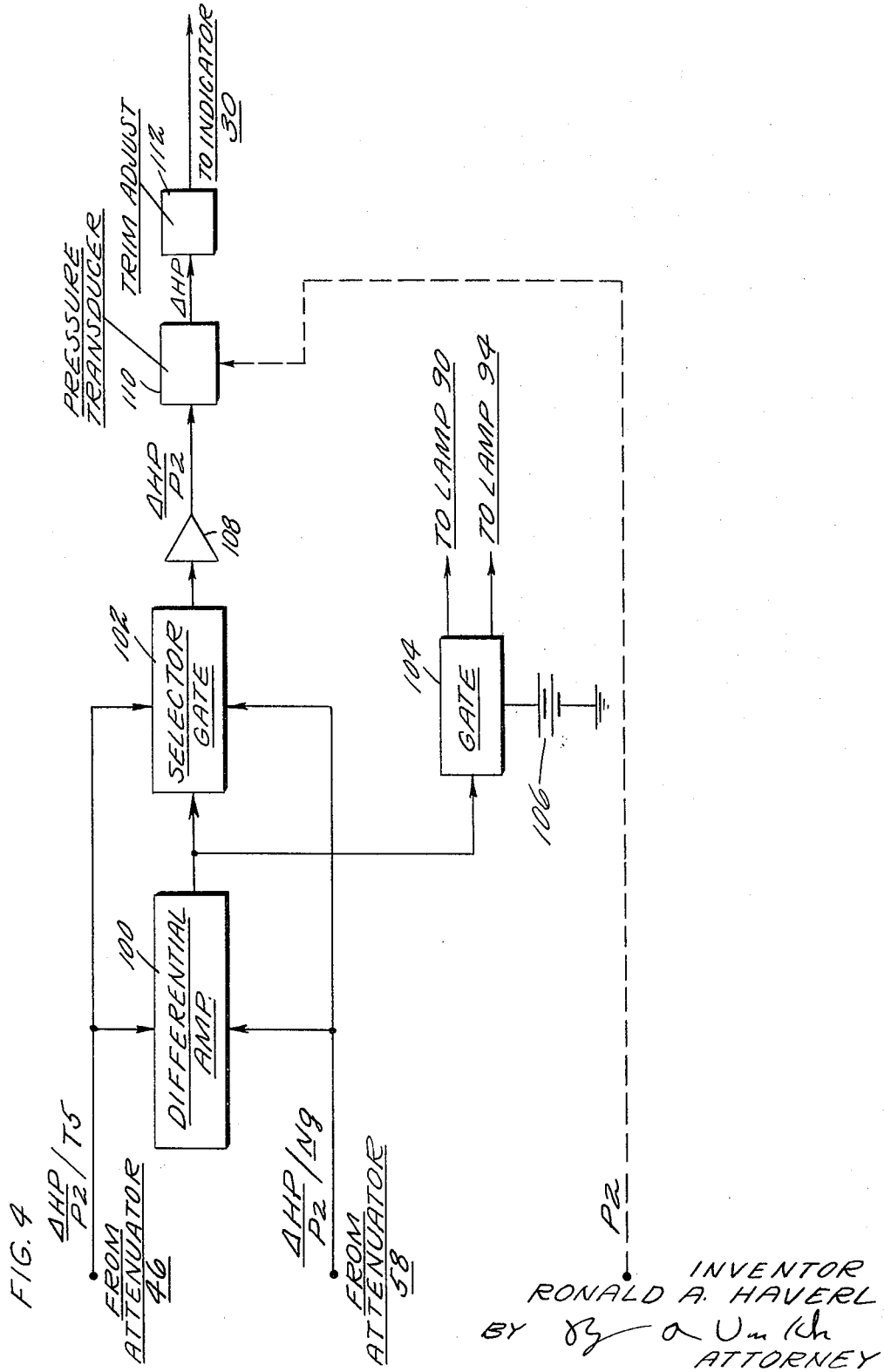

United States Patent Office 3,272,004
Patented Sept. 13, 1966

3,272,004
HORSEPOWER REMAINING COMPUTER
Ronald A. Haverl, Vernon, Conn., assignor to United Aircraft Corporation, East Hartford, Conn., a corporation of Delaware
Filed Sept. 3, 1963, Ser. No. 306,174
8 Claims. (Cl. 73—116)

This invention relates to a horsepower remaining computer for a gas generator. More particularly, this invention is directed to a device which permits the pilot of a turbine powered craft to instantaneously ascertain the actual horsepower remaining available from his engine.

There has long been need for a device which would calculate and display the reserve power available from a gas generator. In craft powered by piston type engines of the past, a manifold pressure gauge provided the pilot with such an indication. With the advent of the gas generator as the propulsion means for aircraft, helicopters and the like, no such indication was available. This was primarily due to the fact that, because of the characteristics of a gas generator, no single quantity or operating parameter could be sensed and utilized to provide an indication of power reserve. In operating the gas turbine power power plant, the pilot must avoid exceeding the prescribed limits for engine r.p.m., temperature of the discharge from the gas generator portion of the power plant and output shaft torque. Each of these parameters, in conjunction with the ambient conditions, limits the maximum horsepower the gas generator can develop. Further, if these parameters are limited by other devices, such as the fuel control, the pilot must know the available margin of the individual limit at the instant of making a decision for power addition.

Until quite recently there was no device available which would provide a pilot with a single display containing all of the above mentioned necessary information in a form which was quickly intelligible. Thus, for example, in executing a maneuver such as landing a turbine-powered helicopter on a pitching deck, it was virtually impossible for the pilot to instantly ascertain that if he pulled up on the collective stick he would get the power required to lift his craft to a safe position should a wave suddenly lift the ship. That is, previously the pilot's decision as to whether or not he had sufficient power reserve to execute a desired maneuver was arrived at as a snap judgment after the rapid scanning of a plurality of instruments. Recently, however, a power remaining indicator was invented which would overcome the above-mentioned problems. This device, which is the subject of copending application Serial No. 255,815, filed February 4, 1963 by C. B. Brahm et al., now U.S. Patent No. 3,181,353, issued May 4, 1965, computed and displayed the percent power remaining available from a gas generator. The present invention is an improvement over the power remaining indicator of Patent No. 3,181,353. Whereas the invention described in the copending application provided an indication of percent power remaining, the invention of the instant application computes and displays the actual absolute horsepower remaining available from a gas generator. While a display of percent power remaining has met with wide pilot approval, many pilots felt that a presentation of actual horsepower remaining would be more meaningful. This is particularly true in the operation of a helicopter where the performance of most maneuvers is predicated on the actual horsepower necessary for the load being transported and thus an indication of the percent power remaining, while helpful, did not completely solve the difficulties, mentioned above, of operating a turbine powered craft without a power remaining indicator. Restated, absolute true horsepower can be equated to lift by a helicopter pilot. For example, on one production type gas turbine powered helicopter, 28 horsepower remaining means that one additional passenger can be carried.

It is therefore an object of this invention to provide a horsepower remaining indicator.

It is another object of this invention to compute the actual absolute horsepower remaining available from a gas generator.

It is a further object of this invention to compute and display the actual horsepower remaining available from a gas generator.

These and other objects of this invention are accomplished by a horsepower remaining computer and indicator system which senses a plurality of power limiting engine parameters and the ambient conditions and utilizes the sensed parameters and conditions to compute the actual horsepower remaining available from the gas generator as a function of each of the sensed power limiting parameters. The horsepower remaining signal indicative of the lesser horsepower remaining is selected and displayed. Simultaneously, the power limiting parameter which is at that instant limiting the horsepower remaining is also displayed.

This invention may be better understood and its numerous advantages will become apparent to those skilled in the art by reference to the accompanying drawing wherein like reference numerals apply to like elements in the various figures and in which:

FIGURE 3 is a block diagram of the horsepower remaining computer of FIGURE 2.

FIGURE 4 is a partial block diagram of a second embodiment of the horsepower remaining computer of FIGURE 2.

Figure 1:
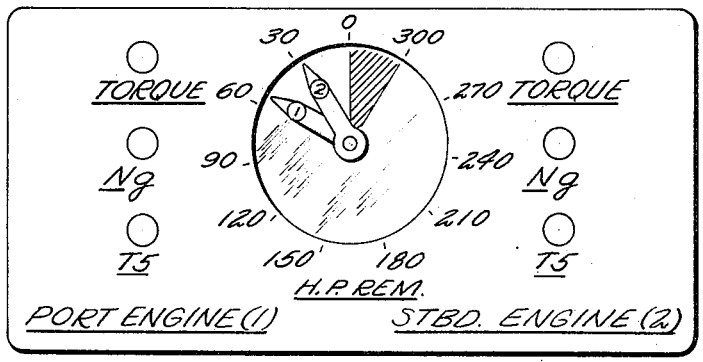
FIGURE 1 is a representation of how the indicator of this invention might be arranged when the invention is employed on a twin engine craft.

While not limited thereto, this invention will be described in connection with computing and indicating the actual horsepower remaining available from a turbine engine consisting of a gas generator driving a free turbine which is in turn connected to a load, such as the rotor of a helicopter, through appropriate gearing. The apparatus of this invention utilizes T2, gas generator compressor inlet temperature; T5, tailpipe or gas generator discharge temperature; Ng, gas generator turbine speed; Nf, free turbine shaft speed; P2, gas generator compressor inlet pressure; and Q, the torque developed by the free turbine, to determine the actual horsepower remaining. It should be noted that quantities T2 and P2 are, particularly in the operation of a helicopter, nearly equal to the ambient conditions. That is, with a helicopter, the ram effect is negligible and thus the ambient conditions rather than the compressor inlet conditions may be sensed and utilized as the engine inlet operating parameters in the device of this invention. As shown in FIGURE 1, the scale of the indicator displays actual horsepower remaining. The indicator shown in FIGURE 1 is designed for use with a twin engine craft and thus comprises a two movement meter thereby providing a single display showing the power remaining in each engine. Use of a two movement meter also has the added advantage of presenting the pilot with an indication as to whether his engines are developing equal amounts of power. It is desirable to maintain load sharing between engines on a multi-engine craft in order to subject each engine to equal wear at the point of going to overhaul.

Figure 2:
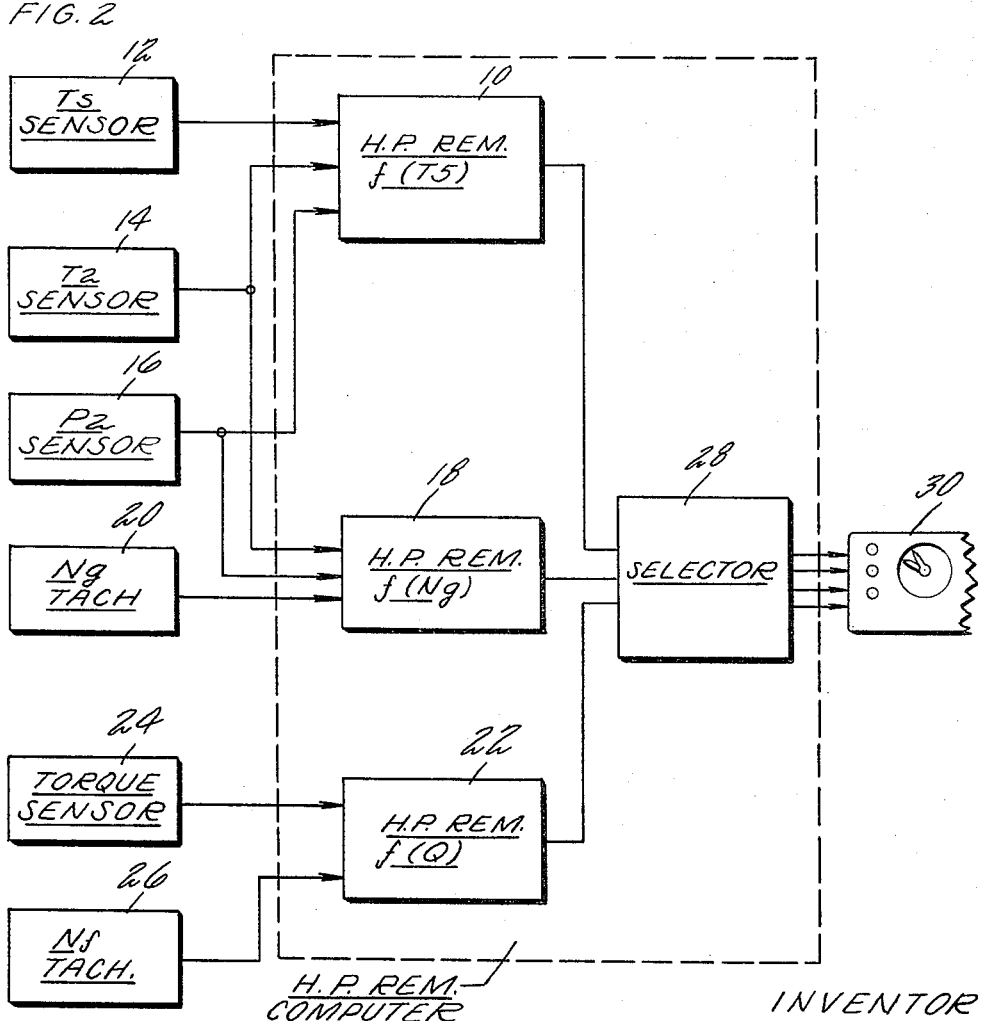
FIGURE 2 is a block diagram of the horsepower remaining indicator which comprises this invention.

From the block diagram, FIGURE 2, the operation of the horsepower remaining indicator of the present invention can be seen. As indicated above, the maximum horsepower which a gas generator can develop is limited by the engine inlet operating conditions and the maximum permissible gas generator discharge temperature, gas generator speed, and free turbine shaft torque. Thus, in order to accurately compute horsepower remaining, it is necessary to calculate horsepower remaining as a function of T5, Ng, and Q. Thereafter, the one of the three horsepower remaining signals indicative of the least horsepower remaining will be gated to a display. To accomplish the foregoing, three computations channels are preferably employed in the apparatus of the present invention. The first channel 10 computes horsepower remaining as a function of gas generator discharge temperature, T5, and has as inputs thereto the signals developed by an engine mounted gas generator discharge temperature sensor 12 and ambient condition sensors 14 and 16 which respectively sense the gas generator inlet temperature, T2, and inlet pressure, P2. Computation channel 18 computes horsepower remaining as a function of gas generator speed, Ng, and accordingly has as inputs thereto the signal developed by a gas generator tachometer 20 and T2 and P2 sensors 14 and 16. Computation channel 22 derives a signal proportional to horsepower remaining as a function of free turbine shaft torque and has as inputs thereto the output of a free turbine mounted torque sensor 24 and a free turbine tachometer 26. The horsepower remaining signals from channels 10, 18 and 22 are applied as inputs to a selector circuit 28 which, as will be described more fully below, may be either a Least or a Most Gate. Selector 28 will pass the signal indicative of the least horsepower remaining to an indicator 30 which may be similar to the indicator shown in FIGURE 1. Also applied to indicator 30, for the purpose of activating a visual or audible indicator, will be a signal indicative of which of the power limiting operating parameters is at that instant limiting the remaining horsepower available.

Referring now to FIGURE 3, the horsepower remaining computer which comprises channels 10, 18, and 22, and selector 28 of FIGURE 2 is shown in more detailed form. As mentioned above, the T5 channel of the horsepower remaining computer receives its inputs signal from a gas generator discharge temperature sensor 12 which may be an engine mounted thermocouple. This T5 signal is compared in a difference circuit 40 with a T5 reference signal from reference voltage source 42. The T5 reference voltage is initially adjusted to be equal to the actual T5 signal generated by the engine mounted sensor at the maximum permissible gas generator tailpipe temperature. The output from difference circuit 40 is thus zero volts at the maximum permissible gas generator discharge temperature and increases as the difference between maximum and actual T5 increases. This difference voltage, for a constant engine T2, is proportional to horsepower remaining divided by compressor inlet pressure, P2. The output of difference circuit 40, $\Delta T5$, is amplified in amplifier 44 and applied to a circuit 46 containing an attenuation which is a function of T2 as measured by the T2 sensor. The function of attenuation circuit 46 is to provide compensation for variations in the ambient temperature. Such compensation is needed since the relationship between power remaining and maximum permissible gas generator discharge temperature varies to some extent with the ambient or gas generator compressor inlet temperature, T2. That is, the slope of the T5 versus horsepower remaining curve plotted for a gas generator is different for each value of T2. Thus, the accuracy of the computer may be significantly improved by providing T2 compensation. The desired compensation is accomplished by multiplying the T5 difference voltage, $\Delta T5$, from amplifier 44 by the T2 signal. Through this multiplication, the slope of the $\Delta T5$ voltage is caused to vary with T2 and compensation for variations in the slope of $$\frac{\Delta T5 \text{ vs. H.P. Remaining}}{P2}$$

curve with T2 fluctuations is achieved. The output of attenuation circuit 46, accordingly, is proportional to horsepower remaining divided by the compressor inlet pressure and is independent of compressor inlet temperature. In order to provide a signal proportional to horsepower remaining and independent of compressor discharge pressure, it is necessary to multiply the output of attenuator circuit 46 by a signal proportional to the ambient or compressor inlet pressure. While this multiplication may be accomplished in various ways, in the interest of clarity the output of attenuation circuit 46 and a signal proportional to P2 from sensor 16 are shown applied to a multiplication circuit 48. The output of multiplication circuit 48 is thus a signal proportional to true absolute horsepower remaining as a function of gas generator discharge temperature. The equations for the horsepower remaining computation performed by the T5 channel are as follows:

(1)
$$T5_{max.} - T5_{actual} = \Delta V5$$

$$\Delta T5 = \frac{\Delta \text{H.P.}}{P2} \cdot f(T2) = \frac{\Delta \text{ H.P.}}{\delta 2} | \Delta T5 | T2 = k$$

where $\Delta \text{H.P.} =$ actual horsepower remaining $$\delta 2 = \frac{P2}{14.7}$$

(2) After T2 compensation, $$\Delta T5 = \frac{\Delta \text{ H.P.}}{P2}$$

(3)
$$\frac{\Delta \text{ H.P.}}{P2} \times P2 = \Delta \text{ H.P. } f(T5)$$

The Ng or gas generator speed channel is driven by a signal from Ng tachometer 20. The tachometer output signal is applied to a speed circuit 50. Speed circuit 50 senses a change in tachometer frequency and puts out a D.C. voltage proportional to frequency which in turn is proportional to speed. A circuit with these characteristics is disclosed in copending application Serial No. 54,073, filed September 6, 1960, by Henry E. Martin, entitled Speed Responsive Control System, now U.S. Patent No. 3,119,055, issued January 21, 1964 and assigned to the same assignee as the present invention. The output of speed circuit 50 is applied to a difference circuit 52 wherein it is compared to a pre-set Ng reference voltage from Ng reference voltage source 54. The voltage provided by source 54 is initially adjusted so as to be proportional to the maximum permissible gas generator speed. The output of difference circuit 52 is thus zero at maximum permissible Ng and increases as actual Ng decreases below its upper limit. The Ng difference signal, for a constant engine T2, is proportional to horsepower remaining divided by compressor inlet pressure and is designated as $$\Delta Ng = \frac{\Delta \text{H.P.}}{\delta 2} | \Delta Ng | T2 = K$$

This signal is amplified in amplifier 56 and is applied to an attenuation circuit 58 containing an attenuation which is a function of T2 as measured by T2 sensor 14. Since the slope of the $$\frac{Ng \text{ vs. Horsepower Remaining}}{P2}$$

Curve also varies with compressor inlet temperature, T2 compensation is desirable in the Ng channel. This compensation is accomplished in the same manner as described above in relation to the T5 channel. Attenuator circuit 58 functions in the same manner as attenuator circuit 46 to multiply the $\Delta Ng$ signal by the T2 signal to thereby provide a resultant signal proportional to actual horsepower remaining divided by compressor inlet pressure. As with the T5 channel, the output of attenuator 58 is applied to a multiplication circuit 60 wherein it is multiplied by the P2 signal from sensor 16 to provide a signal proportional to horsepower remaining as a function of $Ng$. The equations for the horsepower remaining computation performed in the $Ng$ channel are as follows:

(1) $$Ng_{max} - \Delta Ng_{actual} = \Delta Ng$$

$$\Delta Ng = \frac{\Delta H.P.}{P2} f(T2) = \frac{\Delta H.P.}{\delta 2} |\Delta Ng| T2 = K$$

Where $\Delta H.P.$ = actual horsepower remaining $$\delta 2 = \frac{P2}{14.7}$$

(2) After T2 compensation, $$\Delta Ng = \frac{\Delta H.P.}{P2}$$

(3) $$\frac{\Delta H.P.}{P2} \times P2 = \Delta H.P. f(Ng)$$

The torque developed by the gas generator is sensed and applied to a difference circuit 62. In a typical installation, the torque may be sensed in the following manner. The torque delivered by the free turbine through the gear box produces an axial thrust on a second stage helical gear. This force is balanced out by hydraulic pressure in a force balance closed loop configuration that forces the axial displacement of the helical gear to a known position. The balance pressure is a direct measure of delivered torque. Balance pressure is sensed by a pressure transducer and converted to an electrical signal by sensor 24 the output of which is applied to difference circuit 62. In difference circuit 62, the actual torque developed by the free turbine is compared with a torque reference voltage provided by reference voltage source 64. As with the T5 and $Ng$ channels, the torque reference voltage is set so that at maximum permissible torque the difference voltage from circuit 62 is zero. As the torque decreases from maximum, the difference voltage from circuit 62 will increase. The output of difference circuit 62 is substantially inversely proportional to actual horsepower remaining. However, even with isochronous governing of the gas generator, there will be some variation in the speed of the free turbine. Since maximum obtainable torque or horsepower is dependent upon free turbine speed, $Nf$, it may be desirable to correct the output of the torque error signal circuit 62 for changes in free turbine speed. Accordingly, if desired, after amplifications in an amplifier 66, the torque error signal, $\Delta Q$, may be applied to an attenuator 68 in order to modify this signal as a function of free turbine speed. Also applied to attenuator 68 is the output of a speed circuit 70. Speed circuit 70 receives as its input the output of free turbine mounted tachometer 26 and generates an output voltage proportional to $Nf$. The output of attenuator 68 is thus an extremely accurate signal proportional to horsepower remaining as a function of torque developed by the free turbine.

The horsepower remaining signals from multipliers 48 and 60 and attenuator 68 are respectively applied to amplifiers 72, 74 and 76. The outputs of these three amplifiers, which are any well-known type of amplifier which will produce a relatively negative output voltage, are respectively applied to trim adjust circuits 78, 80 and 82. In the trim adjust circuits the horsepower remaining signals are each offset by trim voltages so that the sum of the horsepower remaining signal and offset voltage is zero volts at a pre-selected amount of horsepower remaining and a maximum voltage when the limiting parameter is at its limiting value. That is, when N5, $Ng$ or Q is at its maximum permissible value, there will be no input to its associated horsepower remaining computation channel from the associated difference circuit and accordingly no output from amplifiers 72, 74 or 76. Under these circumstances, the trim voltage will appear at the output of the associated trim adjust circuits 78, 80 or 82. A description of a trim adjust circuit adapted to perform in the above-described manner may be found in above-referenced Patent No. 3,181,353. More particularly, a trim adjust circuit is shown as 42 in FIG. 2 of Patent No. 3,181,353. Thus, the magnitude of the outputs from trim adjust circuits 78, 80 and 82 will vary directly with the actual horsepower remaining as a function of T5, $Ng$ and Q respectively.

The outputs of the three trim adjust circuits are applied to a selector circuit 84. Circuit 84 functions as a Most Gate such that the input having the greatest magnitude is passed to a horsepower remaining indicator 30. A suitable Most Gate is described in the explanation of FIGURE 3 of above-referenced Patent No. 3,181,353. It should be recognized however that the use of a Most Gate is described by way of illustration only and that other circuits for achieving the same function may be utilized without deviating from the scope of this invention. In the embodiment being described, the selected or largest of the horsepower remaining signals will be applied by selector circuit 84 to horsepower remaining indicator 30. A zero horsepower remaining level is set up as a reference voltage on one side of the meter movement of indicator 30 by adjusting a potentiometer in reference voltage source 86. Against this reference the signal selected by circuit 84 is compared. The difference between the selected signal and the reference voltage will drive the meter movement and will thus position a pointer on the face of the meter against a backdrop of a scale calibrated to indicate horsepower remaining. The meter illustrated in FIGURE 1, for example, is calibrated in terms of true absolute horsepower remaining from 300 H.P. to zero. The instrument thus is readable over a range of 20% horsepower remaining for a production type gas generator rated at 1450 horsepower for standard conditions. If deemed necessary, a simple logic circuit such as a trigger driving one input of an And Gate may be utilized to block the reference voltage from the indicator meter until one of the horsepower remaining signals falls below a value indicative of 20% horsepower remaining.

As shown in FIGURE 3 of the above-referenced Brahm et al. Patent No. 3,181,353, through the operation of the Most Gate, selection of one of the three horsepower remaining signals will cause the biasing on of an amplifier associated with the selected input channel. Thus, should T5 be the limiting engine operating parameter, an amplifier 88 will be biased on causing current to flow through an indicator lamp 90. The turning on of lamp 90 will provide an easily observable indication to the pilot that T5 is the parameter limiting the horsepower available from his engine. Similarly, should $Ng$ be the limiting parameter, selector 84 will operate to bias on amplifier 92 and lamp 94 while, should torque be the limiting parameter, amplifier 96 and lamp 98 will be activated.

Referring now to FIGURE 4, a second embodiment of the horsepower remaining computer of this invention is shown. The embodiment of FIGURE 4 permits the elimination of multipliers 48 and 60 as well as other elements of the computer illustrated in FIGURE 3. In FIGURE 4, the outputs from attenuators 46 and 58 of the embodiment of FIGURE 3, which are signals proportional to the horsepower remaining divided by the compressor inlet pressure, are applied to opposite inputs of a differential amplifier 100 and a selector gate 102. The outputs of the differential amplifier 100 will be a signal whose polarity is dependent upon which of the attenuator output signals has the largest magnitude. Differential amplifiers of this type are well known in the art. The output of amplifier 100 is applied as a control signal to selector gate 102 and also as the control signal for a second gating circuit 104. Selector gates 102 and 104 may be two pole solid state switches of a type well known in the art or they may simply be two-pole, double throw mechanical relays. Since the larger of the two input signals to differential amplifier 100 corresponds to the largest amount of horsepower remaining, the output of this amplifier will similarly have a polarity indicative of the larger remaining horsepower. In order to permit selector gate 102 to pass the signal corresponding to the least amount of horsepower remaining, the gate is so connected that a positive signal from differential amplifier 100, indicating that the output of attenuator 46 is of greater magnitude than the output of attenuator 58, will cause contact to be completed between the input to gate 102 which is connected to the output of attenuator 58 and the output of the gate. Gate 104 is similarly connected so that current will be caused to flow through either of lamps 90 or 94 thereby indicating which signal has been selected by gate 102. That is, through the same type of cross connection utilized in gate 102, gate 104 will connect a current source 106 to the indicator lamp corresponding to horsepower remaining channel which has the lesser magnitude signal developed therein.

The output of gate 102 is amplified by amplifier 108 and is transmitted as an excitation signal to a P2 pressure transducer 110. Pressure transducer 110 senses the ambient or compressor inlet pressure and generates a signal proportional thereto. The selected signal is multiplied by this P2 signal in pressure transducer P2 thereby producing an output proportional to horsepower remaining as determined by the power limiting operating parameter, either T5 or Ng, closest to its maximum permissible limit. Thus, the output of pressure transducer 110 is a signal whose magnitude varies directly with actual remaining horsepower available. This signal may be used directly to drive a meter movement, thereby eliminating the need for reference voltage source 86 of FIGURE 3, or it may be applied to a trim adjust circuit 112, identical to the trim adjust circuits mentioned above, to produce a signal whose magnitude is inversely proportional to horsepower remaining. If trim adjust circuit 112 is utilized, the output thereof may be applied directly to indicator 30 of FIGURE 3.

While a preferred embodiment of this invention has been shown and described, various modifications and substitutions may be made without deviating from the spirit and scope of this invention. For example, it should be understood that, for use with a two movement meter of FIGURE 1, two identical circuits; one for each engine; such as that shown in FIGURE 2 must be utilized. It should also be noted that for many applications the torque channel may be dispensed with, as shown in the embodiment of FIGURE 4, without seriously affecting the sensitivity and accuracy of the horsepower remaining computer of this invention Thus, this invention is described by way of illustration rather than limitation.

I claim:
1. In combination with a gas generator having means associated therewith for sensing the values of and producing signals proportional to tailpipe temperature, rotational speed of the gas generator and the pressure adjacent the inlet to the gas generator, a horsepower remaining computer comprising:
   first means for multiplying the difference between the actual tailpipe temperature and the maximum permissible tailpipe temperature by the pressure adjacent the inlet to the gas generator to compute a first signal commensurate with horsepower remaining as a function of tailpipe temperature,
   second means for multiplying the difference between the actual gas generator rotational speed and the maximum permissible speed of rotation by the pressure adjacent the inlet to the gas generator to compute a second signal commensurate with horsepower remaining as a function of rotational speed, and
   means for comparing said first and second signals commensurate with horsepower remaining and for selecting for application to an indicator the one of said signals indicative of the least amount of actual horsepower remaining available from the gas generator.

2. The apparatus of claim 1 wherein the first multiplying means comprises:
   means for generating a first reference signal proportional to the limiting value of the tailpipe temperature,
   means operatively connected to said reference signal generating means and responsive to said first reference signal and said signal proportional to actual tailpipe temperature for producing a first difference signal commensurate with power remaining as a function of tailpipe temperature.

3. The apparatus of claim 2 wherein said second multiplying means comprises:
   means for generating a second reference signal proportional to the limiting value of the gas generator rotational speed, and
   means operatively connected to said second reference signal generating means and responsive to said second reference signal and said signal proportional to actual rotational speed for producing a second difference signal commensurate with power remaining as a function of gas generator rotational speed.

4. A horsepower remaining computer for a gas generator comprising:
   means for sensing the temperature of the discharge from the gas generator and generating a signal proportional thereto,
   means for generating a signal proportional to the limiting value of the discharge temperature,
   means responsive to the signals proportional to the actual and limiting values of discharge temperature for producing a first difference signal indicative of the proximity of the discharge temperature to its limiting value,
   means for sensing the compressor inlet pressure of the gas generator and generating a signal proportional thereto,
   first multiplying means responsive to said first difference signal and to the compressor inlet pressure signal for producing a first signal, commensurate with actual horsepower remaining as a function of discharge temperature,
   means for sensing the rotational speed of the gas generator and generating a signal proportional thereto,
   means for generating a signal proportional to the limiting value of the rotational speed,
   means responsive to the signals proportional to the actual and limiting values of rotational speed for producing a second difference signal indicative of the proximity of the rotational speed to its limiting value,
   second multiplying means responsive to said second difference signal and to the compressor inlet pressure signal for producing a second signal commensurate with actual horsepower remaining, as a function of the rotational speed of the gas generator,
   selector means responsive to said first and second signals commensurate with actual horsepower remaining for passing the one of said signals indicative of the least amount of horsepower remaining, and
   means responsive to the actual horsepower remaining signal passed by said selector means for providing an indication of actual horsepower remaining.

5. The apparatus of claim 4 further comprising:
   means for sensing the torque developed by a means driven by the gas generator and generating a signal proportional thereto,
   means for generating a signal proportional to the limiting value of the torque which can be developed by the means driven by the gas generator,
   means responsive to the signals proportional to the actual and limiting values of the torque developed by the means driven by the gas generator for producing a third difference signal commensurate with actual horsepower remaining as a function of torque, and means for applying said third signal commensurate with actual horsepower remaining to said selector means, whereby said selector means will pass the one of said horsepower remaining signals indicative of the least horsepower remaining to said indicator means.

6. The apparatus of claim 5 further comprising:

means for sensing the compressor inlet temperature of the gas generator and generating a signal proportional thereto:

means responsive to said first difference signal and to said compressor inlet temperature signal for correcting said first difference signal for dependency upon compressor inlet temperature, and means responsive to the second difference signal and to the compressor inlet temperature signal for correcting said second difference signal for dependency upon compressor inlet temperature.

7. A horsepower remaining computer for a gas generator comprising:

means for sensing the temperature of the discharge from the gas generator and generating a signal proportional thereto, means for generating a signal proportional to the limiting value of the discharge temperature, means responsive to the signals proportional to the actual and limiting values of discharge temperature for producing a first difference signal indicative of the proximity of the discharge temperature to its limiting value, means for sensing the rotational speed of the gas generator, means for generating a signal proportional to the limiting value of the rotational speed of the gas generator, means responsive to the signals proportional to the actual and limiting values of rotational speed of the gas generator for producing a second difference signal indicative of the proximity of the rotational speed to its limiting value, selector means responsive to said first and second difference signals for passing the one of said difference signals indicative of the sensed quantity which is nearest to its limiting value, means for sensing the pressure adjacent to the inlet of the compressor of the gas generator and generating a signal proportional thereto, multiplying means responsive to the difference signal passed by said selector means and to the compressor inlet pressure signal for producing a first signal commensurate with actual horsepower remaining as a function of the sensed parameter which is closest to its limiting value, and means responsive to said actual horsepower remaining signal for producing an indication of actual horsepower remaining.

8. The apparatus of claim 7 further comprising:

means for sensing the torque developed by a means driven by the gas generator and generating a signal proportional thereto, means for generating a signal proportional to the limiting value of the torque that can be developed by the means driven by the gas generator, means responsive to the signals proportional to the actual and limiting values of torque developed by the means driven by the gas generator for producing a third difference signal commensurate with actual horsepower remaining as a function of torque, second selector means responsive to said first signal commensurate with actual horsepower remaining and to said third difference signal for selecting the one of said signals indicative of the least amount of actual horsepower remaining for application to said indicator means.

References Cited by the Examiner
UNITED STATES PATENTS

| | | | |
|---|---|---|---|
| 2,941,399 | 6/1960 | Bersinger | 73—116 |
| 3,098,356 | 7/1963 | Joline | 60—39.16 X |
| 3,195,349 | 7/1965 | Hage | 73—116 |

RICHARD C. QUEISSER, *Primary Examiner.*

JERRY W. MYRACLE, *Assistant Examiner.*